J. ALANKO & T. TOIVONEN.
MEASURING MACHINE.
APPLICATION FILED JULY 1, 1913.

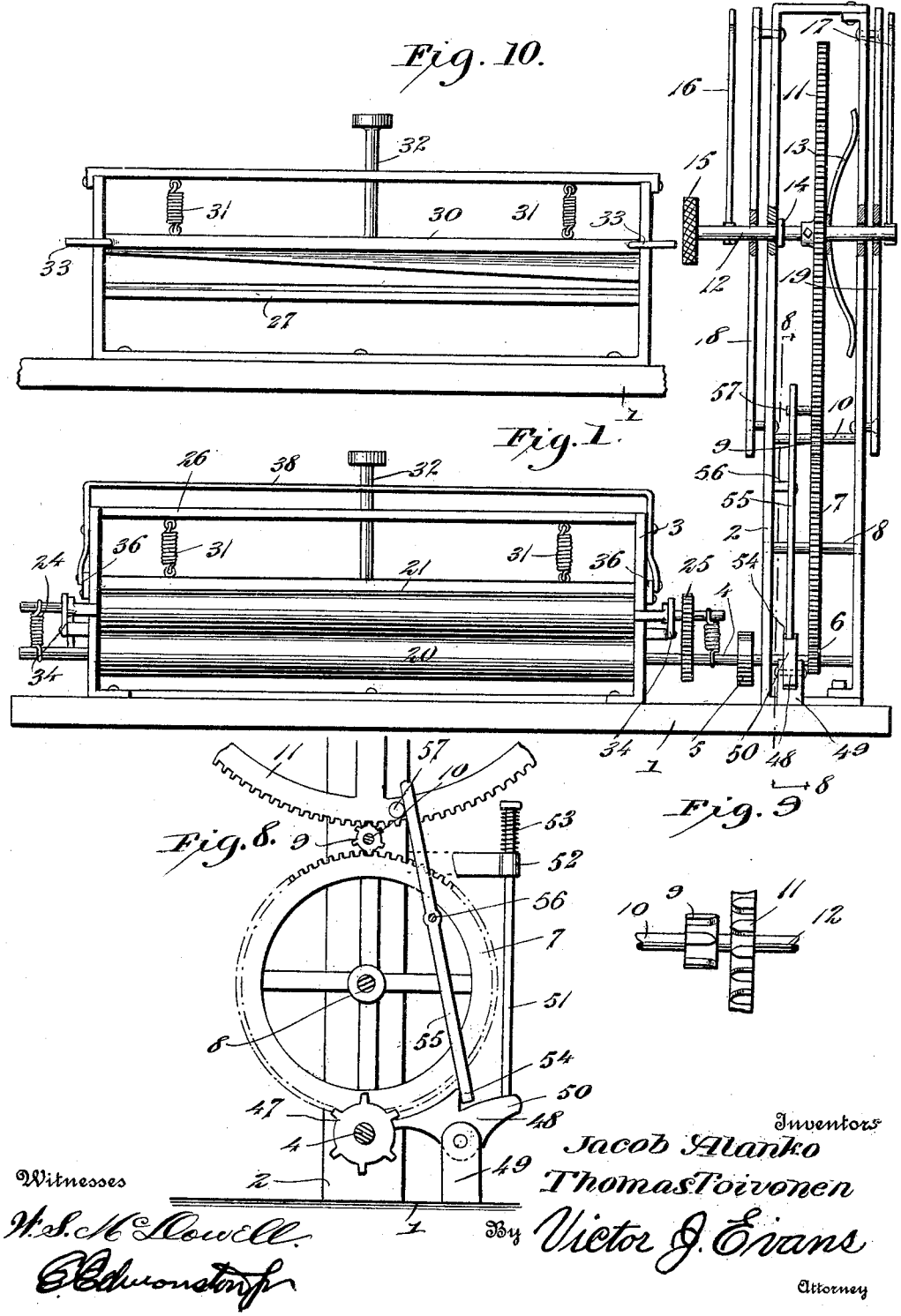
J. ALANKO & T. TOIVONEN.
MEASURING MACHINE.
APPLICATION FILED JULY 1, 1913.
1,103,856.
Patented July 14, 1914.
4 SHEETS—SHEET 1.

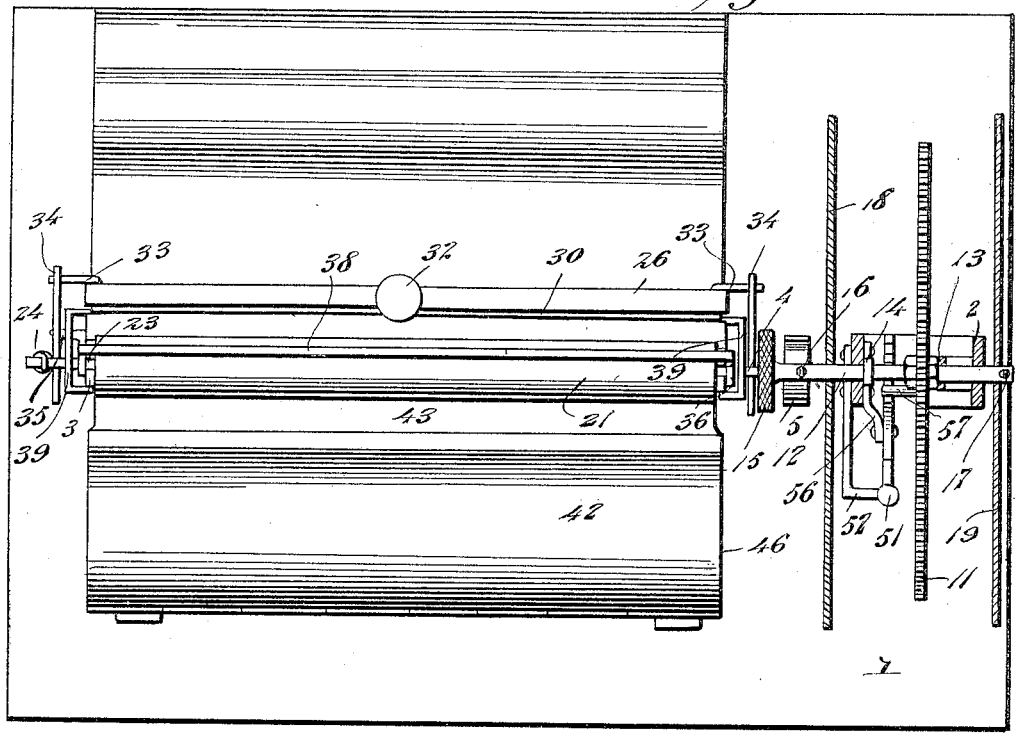
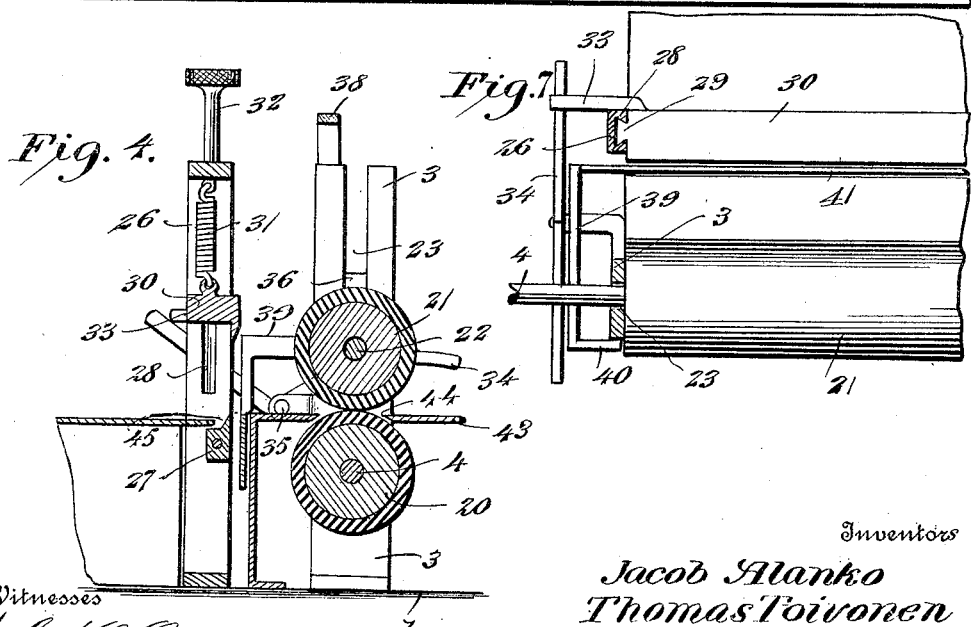

1,103,856.

Patented July 14, 1914.
4 SHEETS—SHEET 3.

Witnesses

Inventors
Jacob Alanko
Thomas Toivonen
By Victor J. Evans
Attorney

J. ALANKO & T. TOIVONEN.
MEASURING MACHINE.
APPLICATION FILED JULY 1, 1913.
1,103,856.
Patented July 14, 1914.
4 SHEETS—SHEET 4.
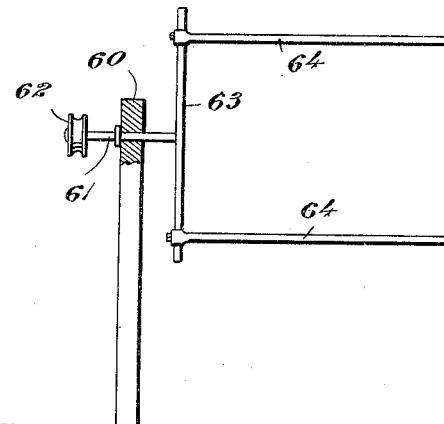
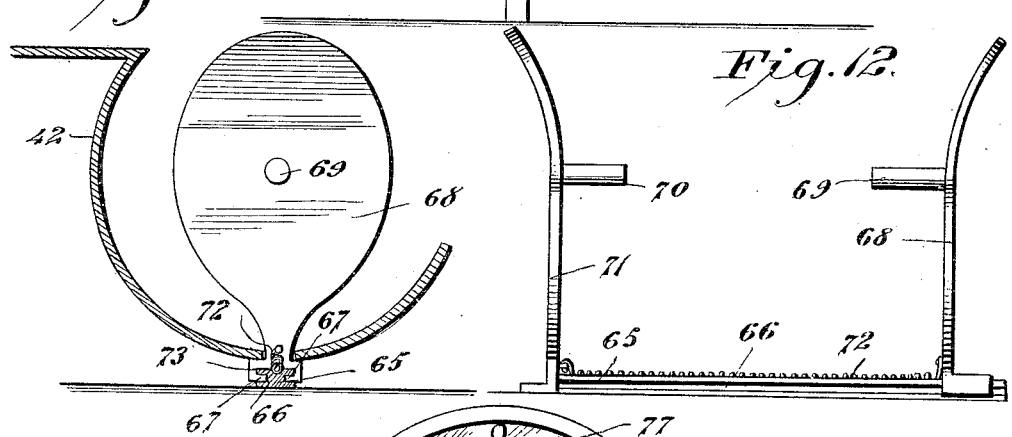
Witnesses
W. S. McDowell
[signature]
Inventors
Jacob Alanko
Thomas Toivonen
By Victor J. Evans
Attorney

UNITED STATES PATENT OFFICE.

JACOB ALANKO AND THOMAS TOIVONEN, OF ASTORIA, OREGON.

MEASURING-MACHINE.

1,103,856.   Specification of Letters Patent.   Patented July 14, 1914.

Application filed July 1, 1913.   Serial No. 776,857.

*To all whom it may concern:*

Be it known that we, JACOB ALANKO and THOMAS TOIVONEN, citizens of the United States, residing at Astoria, in the county of Clatsop and State of Oregon, have invented new and useful Improvements in Measuring-Machines, of which the following is a specification.

This invention relates to measuring machines and more particularly to ribbon or tape measuring machines.

The principal object of the invention is to provide a simple and efficient structure whereby a predetermined quantity of tape, ribbon or like material may be conveniently and expeditiously measured.

Another object of the invention is the provision of a machine of this character which may be either hand or power driven and which after being initially set and started will accurately measure a predetermined amount of ribbon, tape or similar material and be automatically stopped in position for the tape, ribbon or other material to be severed at the proper length.

Further objects of the invention will appear as the following description is read in connection with the accompanying drawings which form a part of this application, and in which:—

Figure 3:
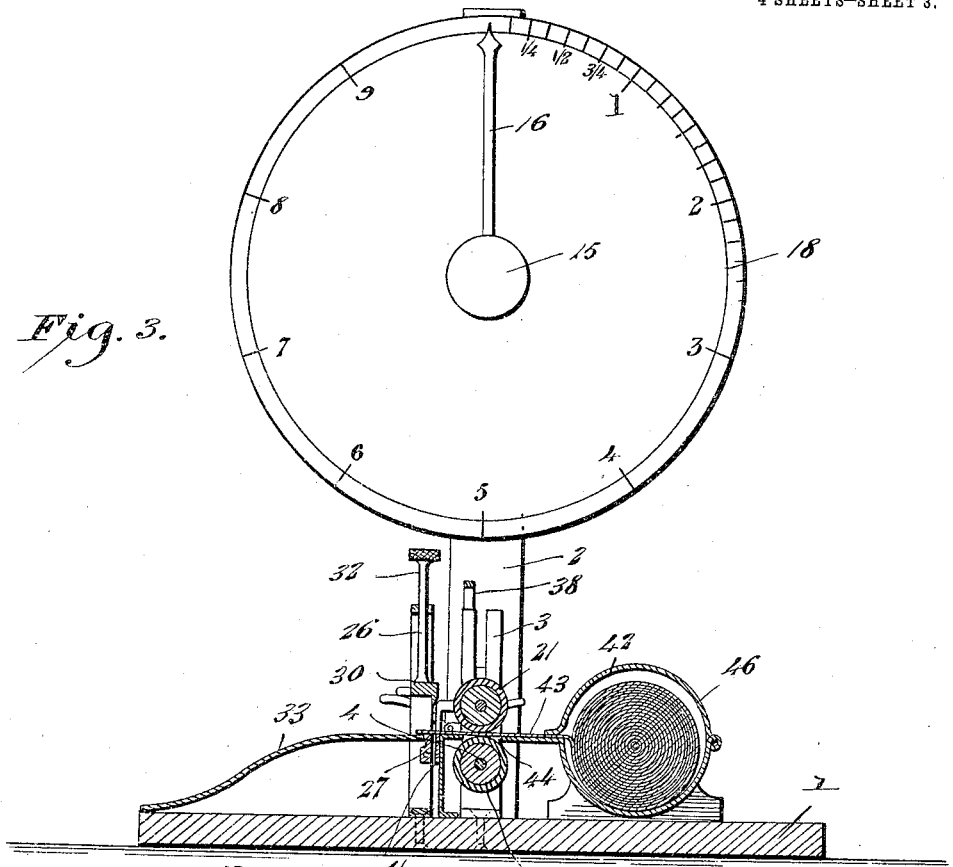
Figure 5:
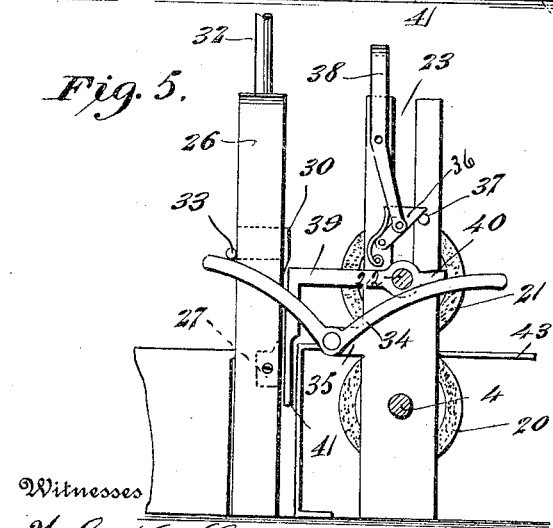
Figure 6:
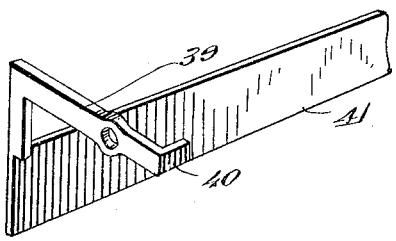

Figure 1 is a rear elevation of the machine. Fig. 2 is a top plan view partly in section. Fig. 3 is a vertical sectional view taken through the machine intermediate the ends of the rolls. Fig. 4 is a detail vertical sectional view on an enlarged scale. Fig. 5 is a detail end elevation. Fig. 6 is a detail perspective view of the tape or ribbon limiting device. Fig. 7 is a detail top plan view showing the arrangement of the cutter bar in its frame. Fig. 8 is a detail vertical sectional view on the line 8—8 of Fig. 1. Fig. 9 is a detail plan view of the connecting pin and pointer driving gear. Fig. 10 is a detail front elevation with parts removed so as to more clearly show the arrangement of the cutter. Fig. 11 is a detail elevation showing an attachment for measuring lace. Fig. 12 is a modification showing a modified form of ribbon holder. Fig. 13 is a vertical sectional view therethrough. Fig. 14 is a detail elevation showing a modification and having parts broken away.

Referring more particularly to the drawing, 1 represents a suitable base upon which all of the mechanism to be hereinafter described is mounted. This base preferably consists of a flat plate of any suitable material and has rising therefrom the frame 2 which is substantially rectangular, as shown. Journaled in the frame 2 and in a frame 3 is the driving shaft 4 upon which is mounted a suitable belt pulley 5 which may be connected by a belt to any suitable type of motor, as will be readily understood. Secured upon the shaft 4 between the sides of the frame 2 is a pinion 6 which is in mesh with a gear 7 mounted upon a shaft 8 also journaled in the frame. This gear 7 meshes with a pinion 9 mounted upon a shaft 10 and the pinion 9 meshes with a gear 11 secured to a shaft 12. The shaft 12 is journaled in the frame 2 and also slidably mounted therein being held in one position by a spring 13 which is arranged between the gear 11 and one side of the frame, the shaft being limited in its movement in this direction by means of a collar 14 secured to the shaft and adapted to abut the front side of the frame, as shown.

The shaft 12 is extended a considerable distance beyond the end of the frame where it is provided with an operating button 15 by which the shaft may be slid in the frame and rotated when desired. The shaft also carries suitable pointers 16 and 17 which operate over dials 18 and 19 secured to the front and back of the frame, as shown in Fig. 1.

Mounted upon the shaft 4 between the ends of the frame 3 is a roller 20. This roller is adapted to coact with a similar roller 21 mounted upon the shaft 22 and vertically movable in the slots 23 formed in the ends of the frame 3. These rollers are held in contact with each other by means of springs 24 which connect the shaft of each, as shown in Fig. 1, and the roller 21 is positively driven by having the shafts 4 and 22 connected by gears 25. These gears have long, pointed teeth so that when the roller 21 is raised and again lowered the gear 25 will properly mesh, as will be readily understood.

Arranged in front of the frame 3 is a substantially rectangular frame 26 having a stationary cutter bar 27 rigidly secured to opposite ends thereof and having its sharpened edge arranged approximately in the plane of the ribbon or tape as it passes between the rollers. The end pieces of the frame are provided with dove-tailed grooves 28 in which is mounted the dove-tailed tenons 29 of the movable cutter bar 30 which is normally held in suspended or raised position by means of the springs 31. The upper cutter bar is provided with a diagonally arranged cutting edge and is depressed against the tension of the springs by means of a plunger 32. As shown, the cutter bar carries a pair of longitudinally extending pins 33 which lie in the paths of bell crank levers 34 Fig. 5 pivoted upon lateral extensions 35 of the end pieces of the frame 3. The pins 33 engage one arm of the bell crank levers and the opposite arms of said levers are engaged beneath the shaft 22 so that when the cutter is depressed to sever the ribbon previously measured the shaft 22 will be raised so as to free the ribbon or tape for a purpose to be hereinafter described.

Upon elevating the shaft 22 as just described the same will be engaged by pivoted and spring pressed catches 36 which extend across the slots 23 and are limited in their movement by the stops 37. To release these catches from the shaft and thereby permit the rollers 21 to engage the roller 20 we provide a bail 38 which is pivoted upon the ends of the frame 3 and has pivotal connection with the catches or dogs 36 so that when the upper end of the bail is pulled toward the right in Fig. 5 the dogs will be released from the shaft and the springs 24 will pull the roller 21 into engagement with the roller 20.

It is desirable to limit the insertion of the tape or ribbon between the rollers and in order to accomplish this we attach to the ends of the shaft 22 a pair of right angular arms 39 which are held in proper position by the engagement of the angular ears 40 with the ends of the frame 3. The lower or depending ends of these arms have connected thereto a limiting plate 41 which extends across the frame 26 adjacent the cutter 27. When this plate is raised with the upward movement of the shaft 22 it will be bridged across the path of movement of the tape or ribbon and thereby limit the insertion of the ribbon between the rollers. When the shaft 22 is lowered the plate will be carried below the upper edge of the stationary cutter 27 and thus permit free movement of the ribbon as actuated by the rollers.

The ribbon or tape is preferably carried in a receptacle 42 formed from a sheet of material extended to produce a platform 43 which is slotted at 44 and 45 to expose the lower roller and the knife 27, respectively, the latter slot also permitting the passage of the limiting plate 41. The receptacle 42 is preferably covered by a hinged lid 46.

As shown in Figs. 1 and 8, the shaft 4 is provided with a toothed wheel 47 which is adapted to be engaged by a dog 48 pivoted upon a standard 49 extending vertically over the base 1. This dog is provided with a lateral extension 50 adapted to be engaged by the release plunger 51 which is slidably mounted in an arm 52 secured to the frame 2 and normally elevated by means of a spring 53 surrounding the same between the head and the arm 52. The dog 48 is also provided with a shoulder 54 which is adapted to be engaged by a lever 55 pivoted upon a bracket 56 carried by the frame 2 and having its upper end arranged in the path of a pin 57 carried by the gear 11.

In the operation of the device the shaft 12 is pushed inwardly against the tension of the spring 13 until the gear 11 becomes disengaged from the pinion 9. The shaft 12 is then turned until the pointers 16 and 17 indicate the desired amount to be measured upon the dials 18 and 19. The shaft is then released and returned to normal position by the spring 13. In this connection it will be noticed that the ends of the teeth upon the pinion 9 and the gear 11 are pointed so that when the gear 11 assumes its normal position under the influence of the spring the teeth of the gear and pinion will properly enter into meshing position. It will be noticed that during the movement of the parts just described that the shaft 4 will be locked against rotation by reason of the engagement of the dog with the toothed wheel 47. To insert the ribbon to its proper position between the rollers the plunger 32 is depressed, thus elevating the roller 21 and the limiting plate 41 by means of the bell crank lever 34, the roller 21 being held in elevated position by the dogs 36 which engage the shaft of the roller. After the ribbon has been inserted through the rollers and its ends brought into contact with the limiting plate 41 the rod 38 is pulled in the direction of the arrow, thus releasing the shaft 22 and permitting the roller 20 to be drawn into engagement with the stationary roller by means of the springs 24. In this position the machine is ready to be started to measure the ribbon, tape or other similar material and this is done by depressing the plunger 51 which releases the dog 48 from the toothed wheel 47 and as the extension 50 is the heaviest part of the dog the dog will remain in the position set by the plunger until the pin 57 contacts with the upper end of the lever 55, it being understood, of course, that the shaft 12 is being driven through the pinion 6, gear 7 and pinion 9 in a direction reverse to its manual manipulation in setting the pointer. Contact of the pin 57 with the lever 55 causes the lever to throw the dog into the path of the toothed wheel which immediately stops the rotation of the driving shaft and consequently the measure of the ribbon. By then depressing the plunger 32 the ribbon may be severed and the roller 21 elevated and locked in elevated position for a second operation.

When it is desired to use the device for measuring lace, which is, as usual, wound upon boards we attach to the base 1 a standard 60 in which is journaled a shaft 61 preferably carrying a pulley 62 at one end and on the opposite end a pair of oppositely extending arms 63. These arms have slidably mounted thereon the split board clamping fingers 64 adapted to engage the lace board and being adjustable are adaptable for different widths of lace. A pulley may be utilized for driving the shaft from the machine if found to be necessary.

In the modifications shown in Figs. 12 and 13 the receptacle 42 is provided with a slotted bottom and arranged beneath the slotted bottom is a guiding track 65 grooved in opposite sides, as shown at 66, and adapted to receive the inturned fingers 67 of the slidably mounted ribbon holding plate 68. This ribbon holding plate is provided with an inwardly extending pintle 69 which cooperates with a similar pintle 70 formed on a stationary holding plate 71 also carried by the bar to hold a bolt of ribbon in the receptacle in position to feed its contents to the roll. A spring 72 is arranged in the groove 73 in the upper portion of the track and is connected at one end to the track and at the opposite end to the movable plate 68.

In the modification shown in Fig. 14 the parts 7, 8, 9 and 10 are dispensed with and a single relatively large gear 74 is employed which meshes with a pinion 75 on the driving shaft and has dials 76 secured to opposite faces thereof. The dials are exposed through openings 76, 77 formed in the casing 78 which incloses the parts. This gear may be made shiftable in the manner of the gear 11 or may be utilized without the stop mechanism when it is desired to measure long lengths of ribbon.

What is claimed is:—

1. A ribbon measuring machine comprising a pair of positively driven feed rolls, mechanism for determining the amount of ribbon to be measured, means for automatically stopping the rotation of the rolls when the quantity has been measured, means for severing the ribbon and means actuated in the movement of the severing mechanism for relatively separating the rolls.

2. A ribbon measuring machine comprising a pair of positively driven feed rolls, one of which is movable toward and away from the other, mechanism for determining the amount of ribbon to be fed through the rolls, mechanism for severing the ribbon, means actuated by the severing mechanism for elevating said movable roll and means for holding the movable roll in elevated position.

3. A ribbon measuring machine comprising a pair of positively driven feed rolls, one of which is movable toward and away from the other, mechanism for determining the amount of ribbon to be fed through the rolls, mechanism for severing the ribbon, means actuated by the severing mechanism for elevating said movable roll and means for holding the movable roll in elevated position and means for releasing the holding means.

4. A ribbon measuring machine comprising a positively driven feed roll, a separate feed roll intergeared with the first roll, means for normally holding the rolls in intergeared relation, mechanism for determining the amount of ribbon to be fed through the rolls, means for automatically stopping the rotation of the positively driven roll, ribbon severing mechanism, and means actuated by the ribbon severing mechanism for elevating the movable roll.

5. In a ribbon measuring machine, the combination with a driven shaft having a feed roll thereon, a frame, a shaft slidably mounted in the frame and having an intergeared connection with the driven shaft, means for holding the positively driven shaft against rotation, means for releasing said holding means, and means actuated in the rotation of the slidably mounted shaft for throwing said holding means to operative position.

6. A ribbon measuring machine comprising a positively driven shaft having a roller thereon, a frame, a shaft slidably mounted in the frame and having a gear thereon, gearing interconnecting the driven shaft and the last-named gear, means for normally holding said last-named gear means in connection with the gearing whereby the slidably mounted shaft will be rotated in an operative position, means for moving the last-named gear out of engagement with the gearing and for rotating it in a direction in opposition to that in which it will be operated by the gearing, means for locking the driven shaft against rotation, means for releasing said locking means and means actuated by the gear for throwing the locking means to operative position.

7. A ribbon measuring machine comprising a driven shaft having a feed roller thereon, a feed roller intergeared with the driven shaft, a frame, a shaft slidably mounted in the frame, a train of gears between the driven shaft and the slidably mounted shaft including a gear keyed to the slidably mounted shaft, means for normally holding the gear on the slidably mounted shaft in mesh with the adjoining gear of the train, means for turning the slidably mounted shaft when the gear thereon is out of mesh with the adjoining gear of the train in a retrograde direction, a pointer carried by the shaft, a graduated dial on the frame over which the pointer travels, means for holding the positively driven shaft against rotation, means for releasing the holding means, and means actuated by the gear on the slidably mounted shaft for throwing the holding means to operative position.

In testimony whereof we affix our signatures in presence of two witnesses.

JACOB ALANKO.
THOMAS TOIVONEN.

Witnesses:
J. O. ERICKSON,
A. A. ANDERSON.

Copies of this patent may be obtained for five cents each, by addressing the "Commissioner of Patents, Washington, D. C."